(12) United States Patent
Niekrasz et al.

(10) Patent No.: US 10,261,993 B1
(45) Date of Patent: Apr. 16, 2019

(54) ADAPTABLE TEXT ANALYTICS PLATFORM

(71) Applicant: SRI International, Menlo Park, CA (US)

(72) Inventors: John J. Niekrasz, Bonita, CA (US); Edmond D Chow, Encinitas, CA (US)

(73) Assignee: SRI International, Menlo Park, CA (US)

(*) Notice: Subject to any disclaimer, the term of this patent is extended or adjusted under 35 U.S.C. 154(b) by 0 days.

(21) Appl. No.: 15/273,484

(22) Filed: Sep. 22, 2016

Related U.S. Application Data

(60) Provisional application No. 62/222,429, filed on Sep. 23, 2015.

(51) Int. Cl.
| | |
|---|---|
| *G06F 17/28* | (2006.01) |
| *G06F 17/30* | (2006.01) |
| *G06N 99/00* | (2019.01) |
| *G06Q 50/20* | (2012.01) |
| *G06F 17/27* | (2006.01) |
| *G09B 19/00* | (2006.01) |

(52) U.S. Cl.
CPC .......... *G06F 17/28* (2013.01); *G06F 17/2785* (2013.01); *G06F 17/30684* (2013.01); *G06N 99/005* (2013.01); *G06Q 50/20* (2013.01); *G09B 19/00* (2013.01)

(58) Field of Classification Search
CPC .............. G06F 17/28; G06F 17/30684; G06F 17/2785; G09B 19/00; G06Q 50/20; G06N 99/005
USPC ........................................................... 704/2
See application file for complete search history.

(56) References Cited

U.S. PATENT DOCUMENTS

| | | | |
|---|---|---|---|
| 2014/0297267 A1* | 10/2014 | Spencer ................ | G06F 17/276 704/9 |
| 2014/0379616 A1* | 12/2014 | Sun ....................... | G06Q 10/101 706/11 |
| 2015/0100303 A1* | 4/2015 | Danson ................. | G06Q 50/205 704/9 |
| 2015/0206440 A1* | 7/2015 | Aylesworth ............. | G09B 5/00 434/362 |
| 2016/0373397 A1* | 12/2016 | Kesten .................... | H04L 51/32 |

* cited by examiner

*Primary Examiner* — Bharatkumar S Shah
(74) *Attorney, Agent, or Firm* — Hickman Palermo Becker Bingham LLP

(57) ABSTRACT

A text analytics platform includes instructions embodied in one or more non-transitory machine accessible storage media configured to cause a computing device to retrieve text from at least one text source and implement one or more algorithms to determine a quantitative linguistics assessment for the retrieved text and provide as output a numeric value corresponding to the quantitative linguistics assessment. The quantitative linguistics assessment is based at least in part on a trained model.

20 Claims, 5 Drawing Sheets

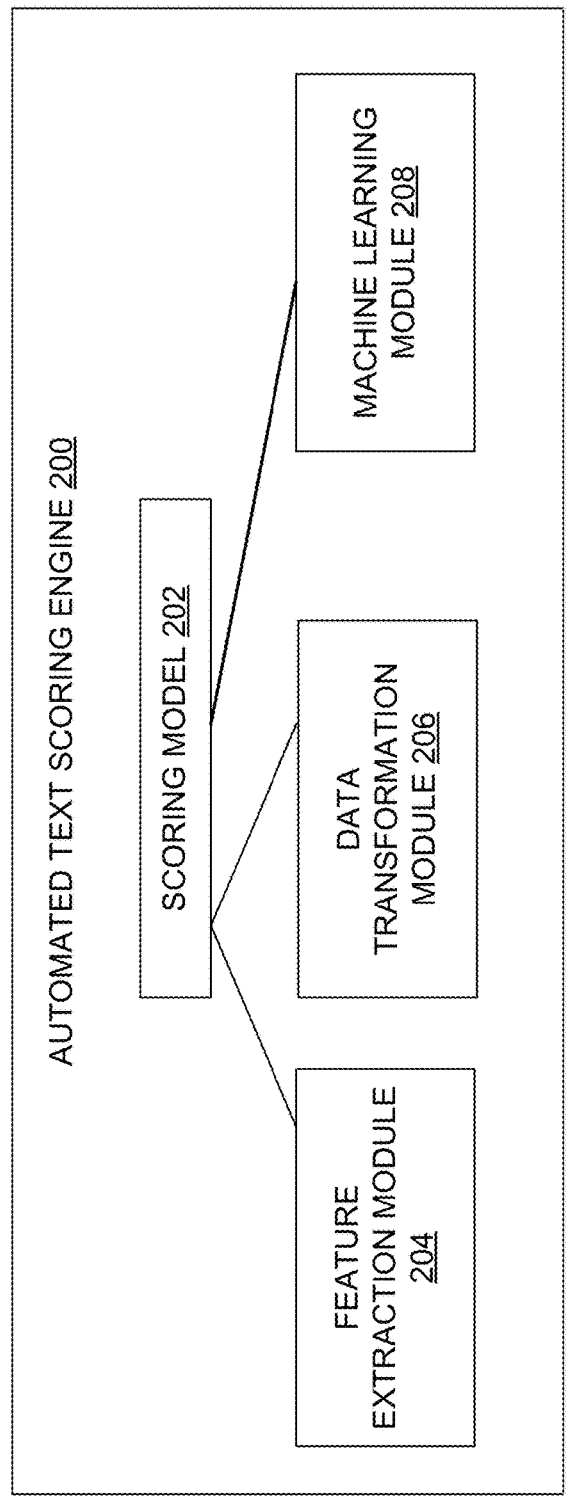

ADAPTABLE TEXT ANALYTICS PLATFORM

CROSS-REFERENCE TO RELATED APPLICATION

This application claims the benefit of U.S. Provisional Patent Application Ser. No. 62/222,429, titled AUTOMATED TEXT SCORING ENGINE and filed on Sep. 23, 2015, the content of which is hereby fully incorporated by reference herein.

BACKGROUND

Teachers of virtually all grades from elementary schools to colleges and even graduate or professional schools typically need to measure student progress throughout the school year, measure development of college and career readiness skills, e.g., using Common Core standards, and forecast future student achievement on high-stakes assessments. However, many—if not most—teachers are usually overwhelmed. Too often, they have too much grading to do, e.g., term papers or other writing assignments, in too little time. Because of this, teachers tend to find it incredibly difficult to provide feedback that is immediate, comprehensive, and detailed.

While some commercial assessment tools presently exist, such as the ETS e-rater and Pearson Intelligent Essay Assessor, such assessment tools are prohibitively expensive, provide only a holistic score rather than any trait-based scoring, are not proven to predict summative scores, and lack connection to the classroom curriculum because they are typically tied to only published provided content and curriculums. Indeed, these assessment tools rely on publisher prompts and curriculum because such assessment tools require at least 200 hand-scored training essays (typically 5,000 minimum essays for meaningful results), significantly more than any teacher could or should need to do in order to train the assessment tool.

BRIEF DESCRIPTION OF THE DRAWINGS

FIG. 2 is a block diagram illustrating another example of a text analytics platform in accordance with certain implementations of the disclosed technology.

DETAILED DESCRIPTION

Figure 1:
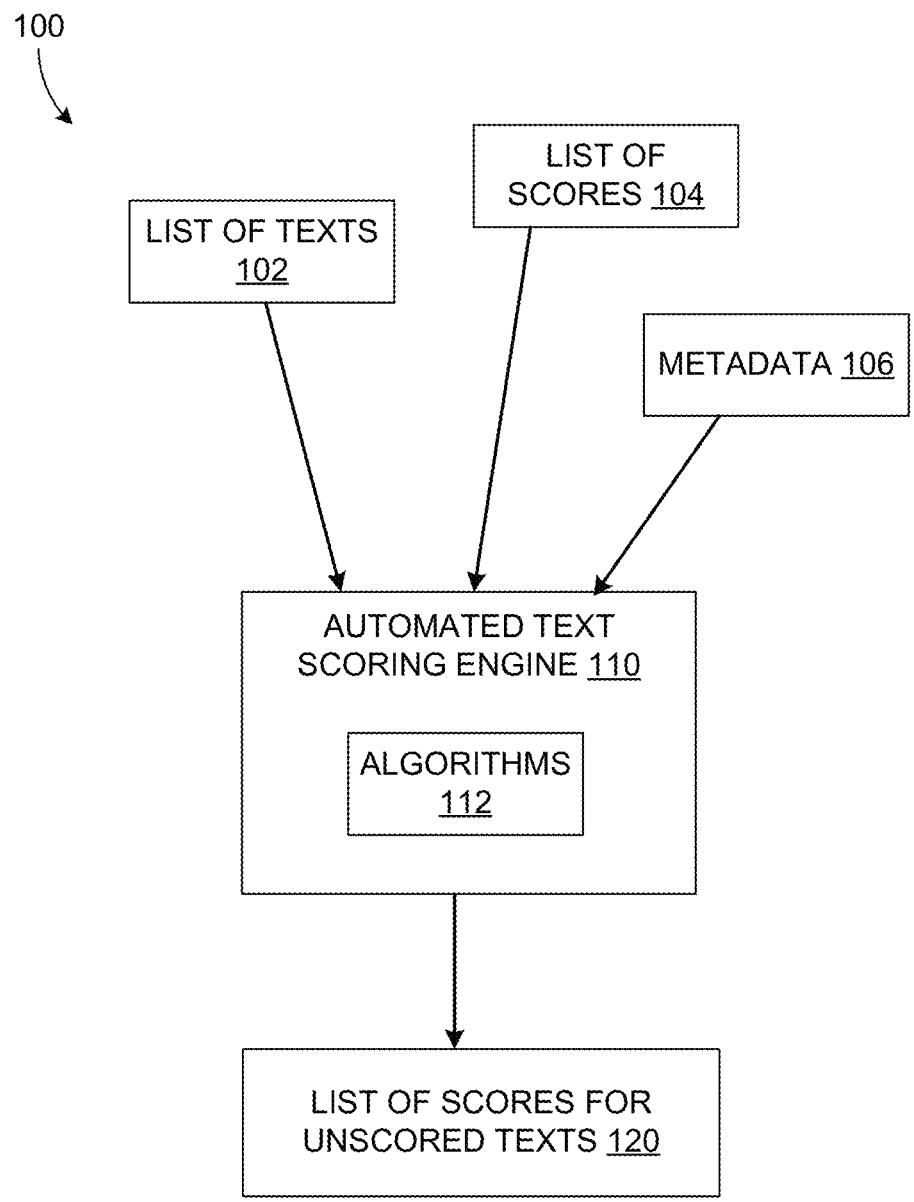
FIG. 1 is a block diagram illustrating an example of a text analytics platform in accordance with certain implementations of the disclosed technology.

Certain implementations of the disclosed technology are generally directed to systems and/or electronic devices that may be configured to automatically assign numeric scores to text documents, e.g., in a manner that attempts to replicate as accurately as possible the manual scoring of such texts by human judges. This may be particularly advantageous in a number of areas, such as the identification of bullying in online chat communities or the grading of student essays for a given writing assessment, for example. Such implementations may also advantageously reduce the high labor costs that are typically associated with obtaining manual human judgments. Such implementations may further be able to advantageously provide reliable scoring of large quantities of responses in domains where such reliable scoring is needed, such as national writing assessments or the monitoring of large online chat rooms, for example.

As used herein, the term text generally refers to any of a number of various types of texts ranging from short bursts of text, such as text messages or natural language interactions on social media platforms such as Twitter feeds and Facebook postings, for example, to longer text documents such as essays, dissertations, or news articles. Also used herein, the term score (also referred to herein as numeric score) generally refers to a quantitative linguistic assessment of a particular text.

Certain implementations of the disclosed technology may include a platform based primarily around an automated text scoring engine (ATSE). The platform generally includes a trainable, domain-independent system that may be configured to assign and further learn to assign numeric scores to various types of text documents. The ATSE may be configured to use advanced text analysis algorithms to identify features of interest in text documents, such as certain word or phrase meanings and discourse relationships, for example. The subsequent use of a machine-learning architecture and training set of hand-scored example texts may enable the ATSE to learn by example in order to assign scores based upon the identified features, for example.

Certain implementations may include a flexible "text regression" pipeline that has two main aspects: text analysis algorithms that may be configured to extract a large variety of features that describe a certain text, e.g., as a vector of numbers; and an ensemble-based regression learner that may be configured to predict a score from the features. The text analysis algorithms may advantageously not need to depend on pre-trained models. Rather than using English part-of-speech taggers, parsers, etc., that have been trained on canonical English documents such as the Wall Street Journal, certain embodiments may use unsupervised learning methods to induce part-of-speech(-like) categories, term clusters, multi-word phrases, etc., directly from the data.

The ATSE may include a software-based system configured to learn how to automatically assign a score, e.g., a numeric value, to a text, e.g., a short text burst or a longer essay, given a training set of exemplary human-scored texts. The numeric value may be within a given range such as zero to one, for example. Such a system may advantageously assign scores to unscored texts in a manner that most accurately replicates the training examples. Such scores may advantageously be multi-trait and Common Core-aligned rather than a traditional single holistic score.

FIG. 1 is a block diagram illustrating an example of a text analytics platform 100 in accordance with certain implementations of the disclosed technology. In the text analytics platform 100, an automated text scoring engine (ATSE) 110 has three inputs: a list of texts 102, a list of scores 104 assigned to some (but not necessarily all) of the texts 104, and metadata 106 about the scores, such as the maximum possible score and minimum possible score, for example.

The ATSE 110 may use text analysis algorithms 112 to generate and provide as output a list of scores for unscored texts 120 in the input. Any or all of the inputs 102-106 and output 120 may be in the form of spreadsheet files, e.g., Microsoft Excel files, or as tab-separated text files or other suitable format(s).

The ATSE 110 may be configured to be trained using anywhere from approximately 100 to 10,000 examples. The text analytics platform 100 may be configured to operate in a single pass over all texts. That is, the text analytics platform 100 may be configured to train itself and assign scores to unscored data in a single execution. This may be done every time essays are to be automatically scored, for example. Software for any or all of the various components of the text analytics platform 100 may be provided as source code in any of a number of suitable programming languages such as Java and R, for example, e.g., using Java and R software development tools.

Certain implementations may include the following steps in executing the ATSE 110: generating features, generating score predictions, and post-processing/validation, each of which may occur responsive to the executing of a single command on the command line, for example. In order to generate features, a Java program configured to generate a set of feature files that characterize the input data may be run. To generate score predictions, an R program configured to learn to score texts based upon the generated features may be run. To perform post-processing and validation, a Java program configured to accumulate the output of the previous step and produce a file containing the final automatic scores may be run.

The contents of the results file may be formatted in the same manner as the input file. It may have the same number of rows, for example, with the documents ordered in the same manner. In certain embodiments, one or more documents that are scored in the input file may be marked, e.g., as NA, in the result file, and one or more scores so marked in the input file may be scored in the results file.

The text analytics platform 100 generally does not depend or need to depend upon pre-trained models of language use, unlike traditional natural language processing approaches that rely upon large collections of annotated data that are used to train models for things such as parsing and part of speech tagging. The text analytics platform 100 may advantageously study the corpus of texts to be analyzed and automatically infer syntactic and semantic patterns directly from them, thus enabling the text analytics platform 100 to be applied across virtually any domain and text type, generally with little or no risk of misalignment between background models and the texts to be scored.

The text analytics platform 100 also generally aligns with Common Core writing standards. For example, one or more of the text analytic algorithms may be designed to predict the quality traits associated with Common Core writing sub-standards, such as the following Common Core aligned traits: introduction (e.g., includes a clearly stated claim, provides a clear preview of the content, and engages the reader), conclusion (e.g., includes a clearly restated claim, provides a clear review of the content, and engages the reader in considering the writer's opinion), coherence and sequencing, relevance and significance (e.g., all evidence clearly supports the prompt, is based on the passage, and is sufficient in elaboration or details), sequencing and coherence (e.g., ideas are grouped by topic and the ideas flow logically with clear relationships, making it easy to follow; and summative work is cohesive), written conventions (e.g., consistently demonstrates an exemplary command of written conventions; may have minor errors that do not interfere with meaning), and language and word choice (e.g., language is clear and the word choice is sophisticated). Exemplary sub-standards include: providing a concluding statement that supports the argument presented, using precise language and domain-specific vocabulary to explain the topic, and using words, phrases, and clauses to create cohesion and clarify the relationships among claim(s), counterclaims, reasons, and evidence.

For improved performance and results, the ATSE 110 may be trained in a prompt-specific way. To score responses to a given specific prompt, the ATSE 110 may be trained using a collection of hand-scored responses to the same prompt, but it is not necessarily bound by this restriction. In certain embodiments, the ATSE 110 may be trained using a collection of responses from multiple prompts and then be used to accurately score responses to a previously unseen prompt. The platform 100 may be re-trainable based on new prompts and reusable for future projects or evaluations.

The nature of the scoring of the texts 102 is generally dependent at least in part on the data used to train the ATSE 110. That is, certain features of the data may be deemed representative of a certain quality or characteristic of the text. As such, the scoring may be at least indirectly driven by the characteristics and/or preferences of the people performing the hand-scoring that yields the training data, e.g., essays.

FIG. 2 is a block diagram illustrating another example of a text analytics platform 200 in accordance with certain implementations of the disclosed technology. In the example, an ATSE, such as the ATSE 110 illustrated by FIG. 1, generally includes two main software components: an ATSE text feature extraction module 204, an ATSE data transformation module 206, and an ATSE machine-learning (ML) workflow module 208, any or all of which may be implemented in Java or other suitable programming language. The ATSE text feature extraction module 204 may use advanced natural language processing (NLP) and text analytics algorithms to identify and measure features of texts, such as discourse relationships and phrase meanings, for example.

An output of the ATSE text feature extraction module 204 may include a numeric representation of each text. The ML workflow module 206 may be employed to optimize and apply a machine learned statistical scoring model. Given the manually scored examples, the ML workflow module 206 may learn how to optimally assign scores based upon the features identified by the text feature extraction module 204. The ML workflow module 206 may leverage an ensemble of state-of-the-art machine learning algorithms, such as gradient boosted trees and random forests, for example.

Figures 3A, 3B:
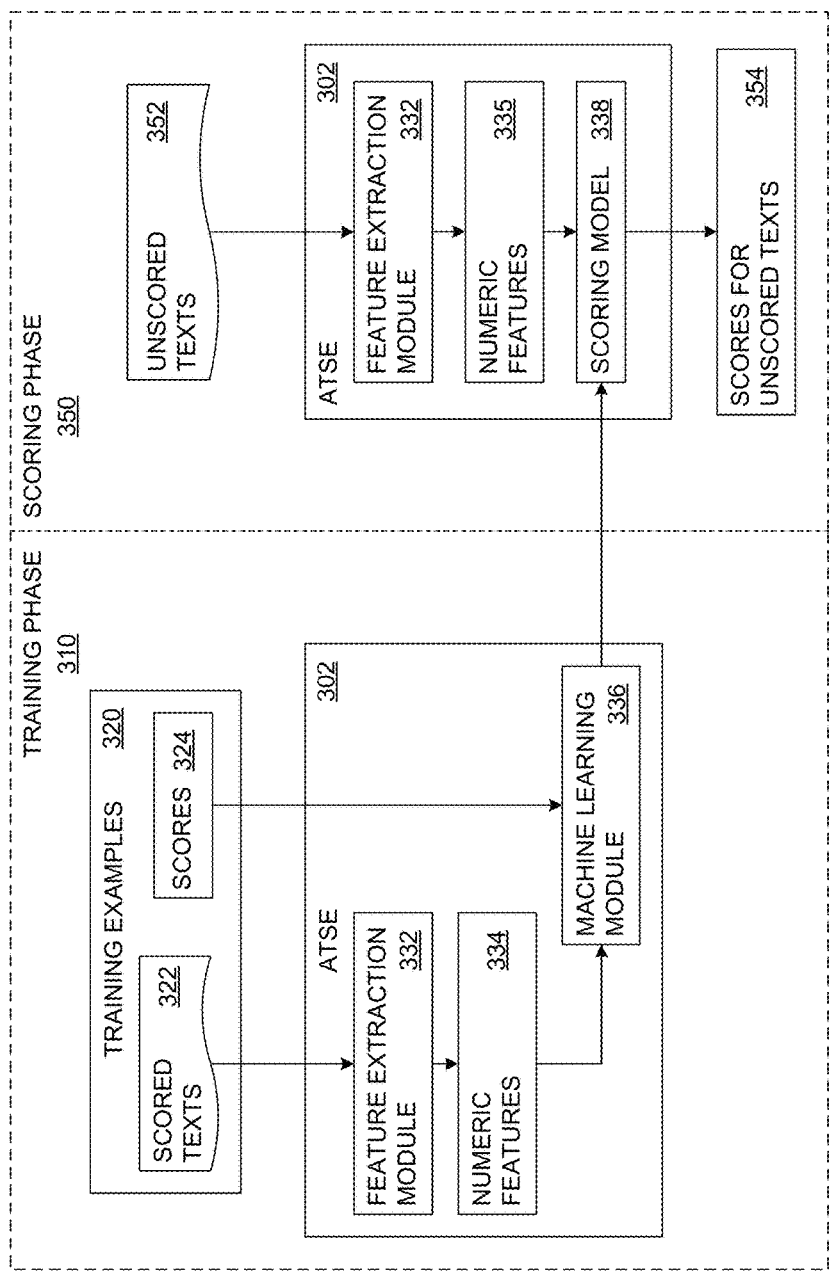
FIG. 3A is a block diagram that illustrates a training phase of a text analytics platform in accordance with certain implementations of the disclosed technology.
FIG. 3B is a block diagram that illustrates a scoring phase of a text analytics platform in accordance with certain implementations of the disclosed technology.

FIGS. 3A and 3B are block diagrams that respectively illustrate a training phase 310 and a scoring phase 350 of a text analytics platform in accordance with certain implementations of the disclosed technology. In certain embodiments, the training phase 310 and scoring phase 350 are conducted at different times. In alternate embodiments, the two phases 310 and 350 may be performed at least partially concurrently.

The text analytics platform includes an ATSE 302, such as the ATSE 110 illustrated by FIG. 1, that is generally configured to assign numeric scores to texts in a manner that accurately reproduces a set of hand-scored training examples. In the training phase 310, multiple training examples 320 may include a collection of exemplary hand-scored texts, including the texts themselves 322 and corresponding scores 324, that are provided to the ATSE 302 as input. The ATSE may use a feature extraction module 332 to extract numerical features 334 from the texts 322 and then learn from the training examples 320, e.g., using a machine learning module 336, advantageously identifying an optimal way to use the features of each text to predict that text's score.

As used herein, the term feature generally refers to trait-specific text properties. In certain embodiments, the feature extraction module 332 may process all received essay texts to extract features, typically thousands of features, to provide as output feature vectors, e.g., long lists of numeric values for each essay. The machine learning module 336 may process the numeric features by using one or more of several distinct learning algorithms and data transformations to provide as output a scoring model 338 that may take feature vectors as input and produce a score. Such algorithms may include any or all of the following: natural language processing (NLP), e.g., using linguistic processing to extract meanings and relationships and using linear regression to predict score (e.g., word embeddings, summarization, analogy); latent semantic analysis (LSA), e.g., mathematically transforming counts of words to identify meanings and topical relevance; and statistical machine learning (SML), e.g., processing the text with whatever means possible and feeding it into general-purpose machine learning classification algorithms.

The scoring model 338 generally contains information, e.g., statistical modeling parameters, that can then be used by ATSE 302 in the scoring phase 350 to score previously unscored texts 352, e.g., using the feature extraction module 332 to extract numerical features 335 from the unscored texts 352, thus resulting in a list of scores 354 corresponding to the previously unscored texts 352. The scoring model 338 may be trained for each prompt-trait pair. For example, the query "Should we get rid of pennies" may be correlated with the sequencing trait. The scoring model 338 may not be language-specific; that is, it may be used for multiple different languages. Alternatively, a separate scoring model 338 may be established for each of a number of different languages.

The ATSE 302 may be designed to be domain-independent and used to accurately score a wide variety of traits in a wide variety of text types and topics. As a machine learning-based system, given a new set of training examples, it can advantageously adapt itself to new scoring tasks without any human intervention. Certain implementations may include an error-checking mechanism configured to capture and report training errors and/or problems pertaining to an unsuccessful pre-validation of input data.

Figures 4A, 4B:
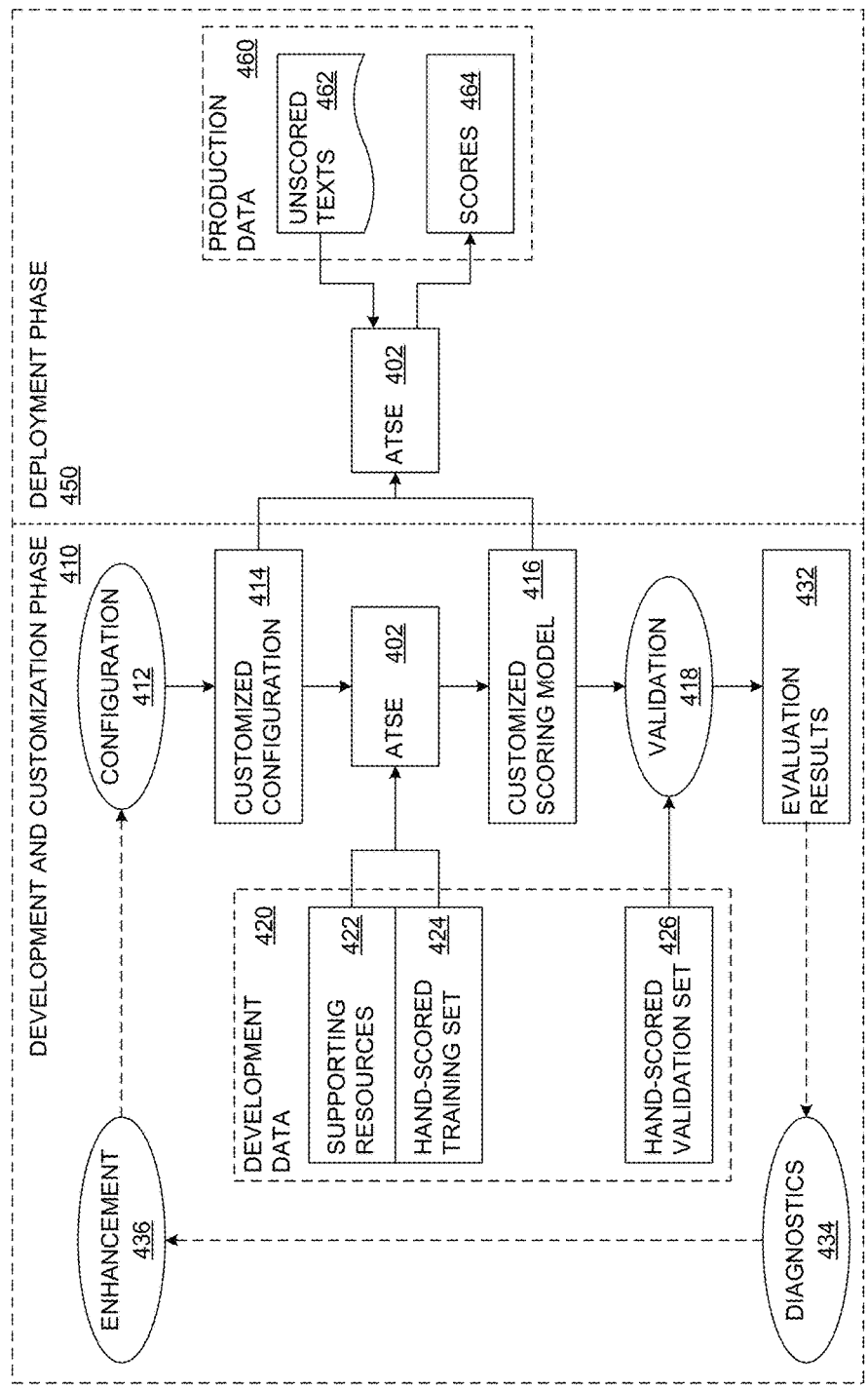
FIG. 4A is a block diagram that illustrates a development/customization phase of a text analytics platform in accordance with certain implementations of the disclosed technology.
FIG. 4B is a block diagram that illustrates a deployment phase of a text analytics platform in accordance with certain implementations of the disclosed technology.

FIGS. 4A and 4B are block diagrams that respectively illustrate a development/customization phase 410 and a deployment/production phase 450 of a text analytics platform that includes an ATSE 402 in accordance with certain implementations of the disclosed technology. In the development/customization phase 410, development data 420 includes supporting resources 422, a hand-scored training set 424 (e.g., a certain number of essays or other texts that have been manually scored), and a hand-scored validation set 426. A configuration 412 (e.g., an initial or default configuration) may be customized 414 before being applied by the ATSE 402. The ATSE 402 is configured to receive the configuration 414, supporting resources 422, and hand-scored training set 424 and, based on these inputs, generate a customized scoring model 416.

The scoring model 416 may be subsequently validated 418 against the hand-scored validation set 426. The evaluation results 432 may be sent to a diagnostics testing for undesirable system behavior, for example. In certain embodiments, an enhancement 436 may be made based on the diagnostics, e.g., to address any diagnosed problems, and then applied to the configuration 412. This process may repeat any number of times to fully customize the ATSE 402 for a particular data set. Once the customization is complete and the ATSE 402 has been fully validated for the new task, a final training round takes place and a final customized scoring model 416, such as the scoring model 202 illustrated by FIG. 2, may then be deployed into production, e.g., the deployment phase 450. The custom configuration 414 may be used to subsequently instruct the feature extraction and ML workflow modules of the ATSE 402 to operate in a manner tailored for customer-specific content and scoring rubric, and the validated scoring model 416 has been automatically optimized to score the target dataset as accurately as possible.

In the deployment phase 450, the ATSE 402 may receive from production data 460 a number of unscored texts 462 such as essays, for example. Based at least in part on the custom configuration 414 and customized scoring model 416 from the development/customization phase 410, the ATSE 402 may apply feature extraction and ML workflow modules to determine and provide as output a list of scores 464, each score corresponding to a particular one of the previously unscored texts 462.

Performance of the ATSE 402 may be determined principally through measurement of the agreement between scores produced automatically by the ATSE 402 and score produced manually, e.g., human consensus scores on a held-out test set, using a suitable metric such as the quadratic weighted kappa statistic as a measure of agreement. Inter-rater reliability may be measure using the same statistic, and the performance of the ATSE 402 may be summarized using the ratio between system-to-consensus agreement and inter-rater agreement. This may provide a simple way of characterizing the performance of the ATSE 402 in terms that are comparable to how human scorers are typically evaluated.

In certain implementations, a front end of the ATSE 402 may be built such that certain users, e.g., school personnel or other authorized users, may use the ATSE 402. Alternatively or in addition thereto, a web-based interface may be established such that certain users may use the ATSE 402 through a web browser.

Figure 5:
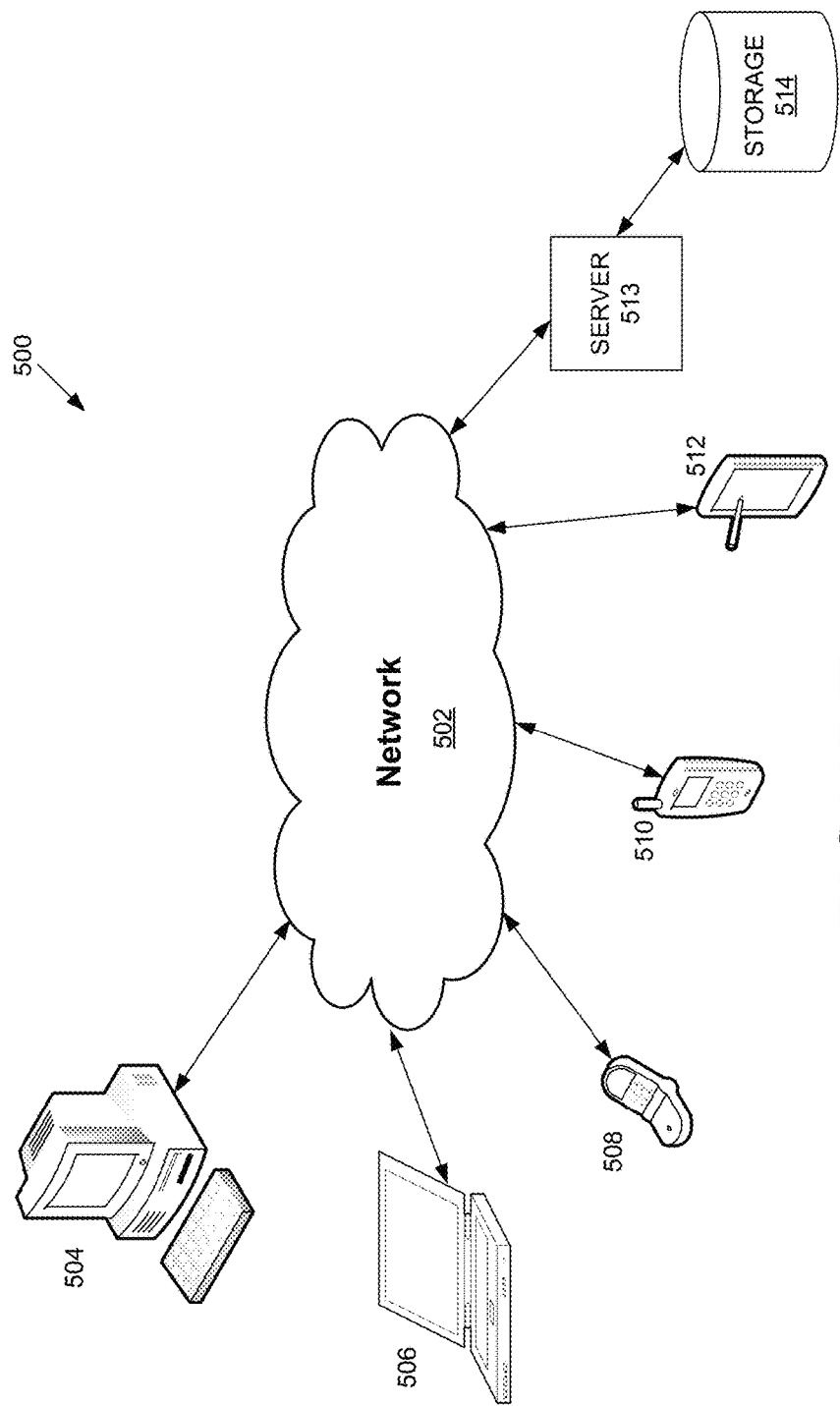
FIG. 5 is a block diagram illustrating an example of a networked system in which embodiments of the disclosed technology may be implemented.

FIG. 5 is a block diagram illustrating an example of a networked system 500 in which embodiments of the disclosed technology may be implemented. In the example, the system 500 includes a network 502 such as the Internet, an intranet, a home network, or any combination thereof. Traditional computing devices such as a desktop computer 504 and laptop computer 506 may connect to the network 502 to communicate with each other or with other devices connected to the network.

The networked system 500 also includes three mobile electronic devices 508-512. Two of the mobile electronic devices, 508 and 510, are mobile communications devices such as cellular telephones or smart phones. The third mobile electronic device, 512, is a handheld device such as a personal data assistant (PDA) or tablet device. Any or all of the devices 504-512 may interact directly or indirectly with each other. A server 513 may manage and/or otherwise interact with any or all of the devices 504-512 over the network 502.

The networked system 500 also includes a storage device 514, which may be a central database or repository, a local data store, or a remote storage device, for example. The storage device 514 may be accessible to any or all of the other devices 504-512, subject to limitations or restrictions by the devices 504-512, a third party, or the storage device 514 itself. The server 513 may manage and/or otherwise interact directly with the storage device 514. The storage device 514 may be used to store some or all of the data and information that is accessed and/or used by any of the computers 504 and 506 or mobile electronic devices 508-512.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A method for improving the ability of a domain-independent automated text analytics process to adapt to a particular text scoring task, the method comprising:
   extracting features from text data received from at least one text source;
   scoring the text data with respect to the particular text scoring task, by a domain-independent scoring model and a customized configuration;
   wherein the customized configuration comprises operating instructions that tailor the domain-independent scoring model to a subset of the text features and a scoring rubric;
   wherein the subset of the text features and the scoring rubric are associated with the particular text scoring task;
   wherein the method is performed by one or more computing devices.

2. The method of claim 1, wherein the domain-independent scoring model is trained with training data at least partially concurrently with the scoring.

3. The method of claim 1, wherein the domain-independent scoring is performed using any one or more of the following: a natural language processing (NLP) algorithm, a latent semantic analysis (LSA) algorithm, a statistical machine learning (SML) algorithm.

4. The method of claim 1, wherein the text data includes any one or more of the following: a text document, a text message, a social media interaction; wherein the social media interaction includes any one or more of the following: a Twitter tweet, a Facebook posting, a Snapchat image or video, an Instagram image or video.

5. The method of claim 1, wherein the domain-independent scoring model is trained based on a plurality of human-scored text data.

6. The method of claim 1, wherein the domain-independent scoring model is trained for a plurality of prompt-trait pairs.

7. The method of claim 1, wherein the domain-independent scoring model is trained using a machine learning-based algorithm associating the text features with scores according to the scoring rubric, wherein the text features are extracted from training data in accordance with the scoring rubric.

8. The system of claim 1, comprising outputting a numeric value within a range from 0 to 1 corresponding to a quantitative linguistic assessment of the text data.

9. The system of claim 1, comprising, based on the scoring, outputting data indicative of a determination that the text data evidences potential bullying of at least one person.

10. The system of claim 1, comprising, based on the scoring, outputting a grading of the text data, wherein the text data comprises a student essay.

11. A computer program product comprising:
   one or more non-transitory computer-readable storage media comprising instructions which, when executed by one or more processors, cause:
   extracting features from text data received from at least one text source;
   scoring the text data with respect to the particular text scoring task, by a domain-independent scoring model and a customized configuration;
   wherein the customized configuration comprises operating instructions that tailor the domain-independent scoring model to a subset of the text features and a scoring rubric;
   wherein the subset of the text features and the scoring rubric are associated with the particular text scoring task.

12. The computer program product of claim 11, wherein the domain-independent scoring model is trained with training data at least partially concurrently with the scoring.

13. The computer program product of claim 11, wherein the scoring is performed using any one or more of the following: a natural language processing (NLP) algorithm, a latent semantic analysis (LSA) algorithm, a statistical machine learning (SML) algorithm.

14. The computer program product of claim 11, wherein the text data includes any one or more of the following: a text document, a text message, a social media interaction; wherein the social media interaction includes any one or more of the following: a Twitter tweet, a Facebook posting, a Snapchat image or video, an Instagram image or video.

15. The computer program product of claim 11, wherein the domain-independent scoring model is trained based on a plurality of human-scored text data.

16. The computer program product of claim 11, wherein the domain-independent scoring model is trained for a plurality of prompt-trait pairs.

17. The computer program product of claim 11, wherein the domain-independent scoring model is trained using a machine learning-based algorithm associating the text features with scores according to the scoring rubric, wherein the text features are extracted from training data in accordance with the scoring rubric.

18. The computer program product of claim 11, wherein the instructions, when executed by the one or more processors, cause outputting a numeric value within a range from 0 to 1 corresponding to a quantitative linguistic assessment of the text data.

19. The computer program product of claim 11, wherein the instructions, when executed by the one or more processors, cause, based on the scoring, outputting data indicative of a determination that the text data evidences potential bullying of at least one person.

20. The computer program product of claim 11, wherein the instructions, when executed by the one or more processors, cause, based on the scoring, outputting a grading of the text data, wherein the text data comprises a student essay.

\* \* \* \* \*